(12) United States Patent
Zhang et al.

(10) Patent No.: US 8,270,847 B2
(45) Date of Patent: Sep. 18, 2012

(54) POLARIZATION MULTIPLEXING WITH DIFFERENT DPSK MODULATION SCHEMES AND SYSTEM INCORPORATING THE SAME

(75) Inventors: Hongbin Zhang, Marlboro, NJ (US); Jin-Xing Cai, Morganville, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 612 days.

(21) Appl. No.: 12/364,171

(22) Filed: Feb. 2, 2009

(65) Prior Publication Data

US 2010/0196016 A1 Aug. 5, 2010

(51) Int. Cl.
*H04B 10/04* (2006.01)

(52) U.S. Cl. ........ 398/183; 398/188; 398/184; 398/185; 398/152; 398/202; 398/65; 398/212; 398/213; 398/208; 398/159

(58) Field of Classification Search ............... 398/183, 398/184, 188, 79, 185, 152, 65, 81, 195, 398/202, 208, 209, 214, 192, 193, 212, 213, 398/147, 201, 158, 159, 162
See application file for complete search history.

(56) References Cited

U.S. PATENT DOCUMENTS

| | | | |
|---|---|---|---|
| 7,333,732 B2 | 2/2008 | Domagala | |
| 7,715,730 B2 * | 5/2010 | Hecker et al. | 398/184 |
| 2003/0090768 A1 * | 5/2003 | Liu et al. | 359/183 |
| 2004/0114939 A1 | 6/2004 | Taylor | |
| 2004/0161245 A1 | 8/2004 | Bergano | |
| 2004/0184819 A1 * | 9/2004 | Vassilieva et al. | 398/188 |
| 2004/0208646 A1 * | 10/2004 | Choudhary et al. | 398/188 |
| 2007/0009269 A1 * | 1/2007 | Zitelli | 398/188 |
| 2007/0206960 A1 | 9/2007 | Nissov et al. | |

OTHER PUBLICATIONS

Gnauck, et al., "Optical π/2-DPSK and its tolerance to filtering and polarization-mode dispersion," IEEE Photonics Technology Letters; Nov. 2003; vol. 15, Issue: 11, on pp. 1639-1641.
International Search Report and Written Opinion dated Mar. 31, 2010 issued in related International Patent Application No. PCT/US2010/022709.

* cited by examiner

*Primary Examiner* — Hanh Phan
(74) *Attorney, Agent, or Firm* — Grossman, Tucker, Perreault & Pfleger, PLLC

(57) ABSTRACT

Polarization multiplexing with different differential phase shift keying (DPSK) schemes generally uses DPSK modulated signals modulated using different DPSK modulation schemes and combined with orthogonal polarizations relative to each other. The different DPSK modulation schemes may use different DPSK phase shifts to represent data, such as a regular DPSK modulation scheme and a π/2 DPSK modulation scheme. By using different DPSK modulation schemes to represent data on the orthogonally polarized signals, the DPSK demodulators may effectively separate the orthogonally polarized signals using the property of the DPSK receivers. To optimize performance, the DPSK modulated signals may also be bit-interleaved when combined with orthogonal polarization.

15 Claims, 4 Drawing Sheets

POLARIZATION MULTIPLEXING WITH DIFFERENT DPSK MODULATION SCHEMES AND SYSTEM INCORPORATING THE SAME

TECHNICAL FIELD

The present application relates to the optical transmission of information and more particularly, to polarization multiplexing with different DPSK modulation schemes and system incorporating the same.

BACKGROUND

Known long-haul systems have been implemented using binary modulation formats wherein a single data bit is modulated on a single transmitted symbol. One method of performing binary modulation is known as On-Off-Keying (OOK), wherein the transmitted pulse is turned on and off with the ones and zeros of a data bit stream. On-Off-Keying may be implemented in a variety of well-known formats, such as Return-to-Zero (RZ), Non-Return to Zero (NRZ) and Chirped-Return-to-Zero (CRZ) formats. Generally, in an RZ format the transmitted optical pulses do not occupy the entire bit period and return to zero between adjacent bits, whereas in a NRZ format the optical pulses have a constant value characteristic when consecutive binary ones are sent. In a chirped format, such as CRZ, a bit synchronous sinusoidal phase modulation is imparted to the transmitted pulses.

Differential phase-shift-keying (DPSK) is another binary modulation method known to those of ordinary skill in the art. In a DPSK format, the optical intensity of the signal may be held constant, while ones and zeros are indicated by differential phase transitions. Variations of the DPSK modulation formats include RZ-DPSK, wherein a return-to-zero amplitude modulation is imparted to a DPSK signal, and CRZ-DPSK.

When the bit rate of a transmission system is increased, e.g. to 40 Gb/s, transmission penalties may become more pronounced. For higher bit rates, multi-level modulation formats have been attractive due to their high spectral efficiency and increased tolerance to chromatic dispersion and polarization mode dispersion compared with the same line rate as binary modulation formats. In a multi-level modulation format multiple data bits may be encoded on a single transmitted symbol.

A number of multi-level modulation formats are known. Two types of multi-level modulation formats that have been considered for 40 Gb/s long-haul optical transmission systems are return-to-zero differential quadrature phase shift keying (RZ-DQPSK) and polarization multiplexing (POLMUX) RZ-DPSK, which involves sending a pair of 20 Gb/s signals at orthogonal polarizations. Both of these formats achieve 2 bits/symbol modulation.

It has been found that that 40 Gb/s POLMUX-RZ-DPSK outperforms 40 Gb/s RZ-DQPSK by ~4 dB in a 5,200 km Raman assisted EDFA system with 150 Km repeater spacing and 66.6 GHz channel spacing mainly due to higher nonlinear phase noise tolerance and sensitivity. Unfortunately, however, POLMUX-RZ-DPSK requires a receiver including a polarization controller to track the input random state of polarization for each channel and a polarizer to suppress the orthogonal neighboring channel. Any loss of polarization control may result in a degradation of Q-factor in a POLMUX-RZ-DPSK system.

A frequency offset polarization division multiplexing (PDM) method and system was developed to eliminate the need for the polarization tracker at the receiver, as described in greater detail in U.S. patent application Ser. No. 12/187,084 filed Aug. 6, 2008, which is fully incorporated herein by reference. According to this frequency offset PDM technique, the frequencies of two polarization combined DPSK signals may be separated by ¼ of the free spectral range (FSR) of the demodulator.

BRIEF DESCRIPTION OF THE DRAWINGS

Reference should be made to the following detailed description which should be read in conjunction with the following figures, wherein like numerals represent like parts.

DETAILED DESCRIPTION

In general, a system consistent with the present disclosure implements a variation of a POLMUX-DPSK modulation format without use of a receiver including a polarization controller to track the input random state of polarization for each channel and a polarizer to suppress the orthogonal neighboring channel. In one exemplary embodiment, two DPSK modulated signals modulated using different DPSK modulation schemes are combined with orthogonal polarizations relative to each other. The different DPSK modulation schemes may use different DPSK phase shifts to represent data, such as a regular DPSK modulation scheme and a π/2 DPSK modulation scheme, as will be described in greater detail below. By using different DPSK modulation schemes to represent data on the orthogonally polarized signals, the DPSK demodulators may effectively separate the orthogonally polarized signals using the property of the DPSK receivers. To optimize performance, the two DPSK modulated signals may also be bit-interleaved when combined with orthogonal polarization.

Figure 1:
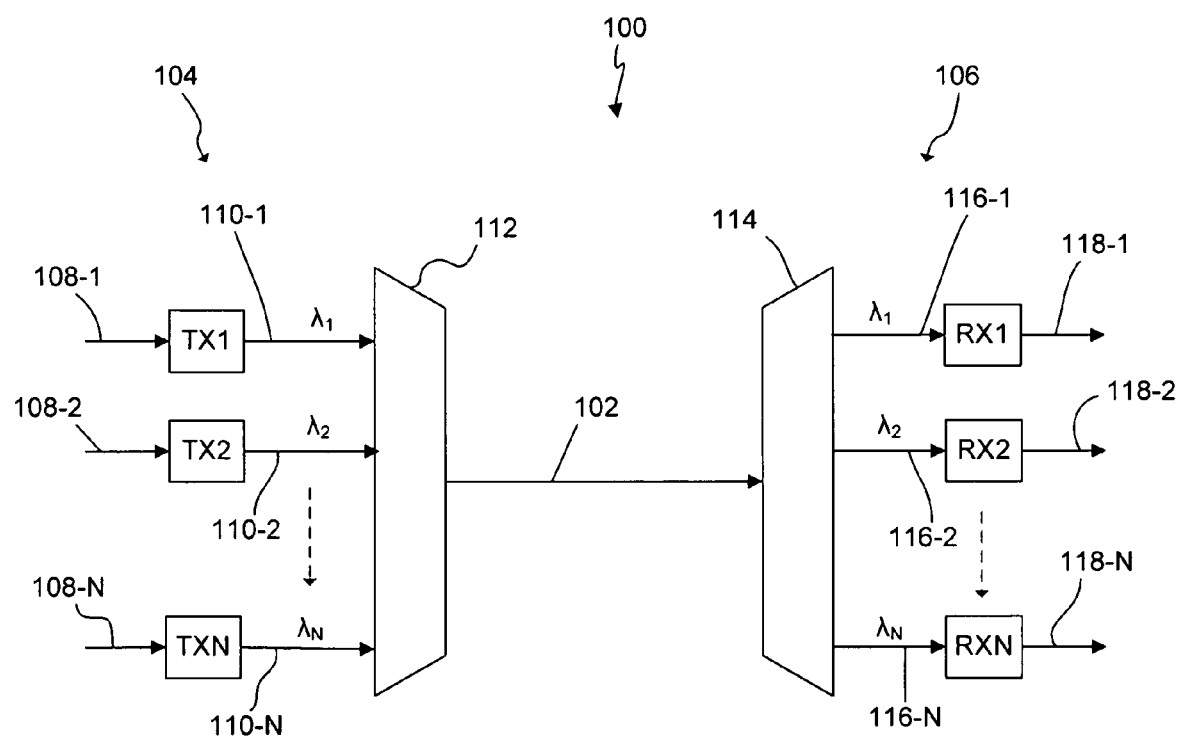
FIG. 1 is a simplified block diagram of one exemplary embodiment of a system consistent with the present disclosure.

FIG. 1 is a simplified block diagram of one exemplary embodiment of a WDM transmission system 100 consistent with the present disclosure. The transmission system 100 serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver, for example, at a distance of 5,000 km, or more. The polarization multiplexing with different DPSK modulation schemes, consistent with the present disclosure, may also be use in other systems such as terrestrial systems configured for transmitting from a transmitter to a receiver, for example, at distances in a range of about 2,000 km to 3,000 km.

Those skilled in the art will recognize that the system 100 has been depicted as a highly simplified point-to-point system for ease of explanation. For example, the transmitting terminal 104 and receiving terminal 106 may both be configured as transceivers, whereby each may be configured to perform both transmitting and receiving functions. For ease of explanation, however, the terminals are depicted and described herein with respect to only a transmitting or receiving function. A system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal having a first data rate on an associated input port 108-1, 108-2 . . . 108-N. Consistent with the present disclosure, one or more of the transmitters TX1, TX2 . . . TXN may transmit a pair of orthogonally polarized signals on associated optical carrier wavelengths, $\lambda_1, \lambda_2 \ldots \lambda_N$. Data may be modulated on the wavelengths $\lambda_1, \lambda_2 \ldots \lambda_N$ in a known fashion using a DPSK modulation format, e.g. a RZ-DPSK or CRZ-DPSK format, with each of the pair of orthogonally polarized signals being modulated using different DPSK phase changes or shifts (e.g., DPSK and $\pi/2$ DPSK).

For a 40 Gb/s input signal at port 108-N, for example, the transmitter TXN may time-division demultiplex the input signal into a pair of 20 Gb/s signals. The transmitter TXN may modulate a first one of the pair of 20 Gb/s signals using a regular DPSK modulation scheme and a second one of the pair of 20 Gb/s optical signals using a $\pi/2$ DPSK modulation scheme. The first signal modulated using the DPSK modulation scheme may then be orthogonally polarized relative to the second signal modulated using the $\pi/2$ DPSK modulation scheme. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 . . . 10-N. The data channels are combined into an aggregate signal on optical path 102 by a multiplexer or combiner 112. The optical path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N coupled to associated receivers RX1, RX2 . . . RXN. One or more of the receivers RX1, RX2 . . . RXN may be configured to demodulate the transmitted signal and provide an associated output data signal at the first data rate on an associated output path 118-1, 118-2 . . . 118-N. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

Figure 2:
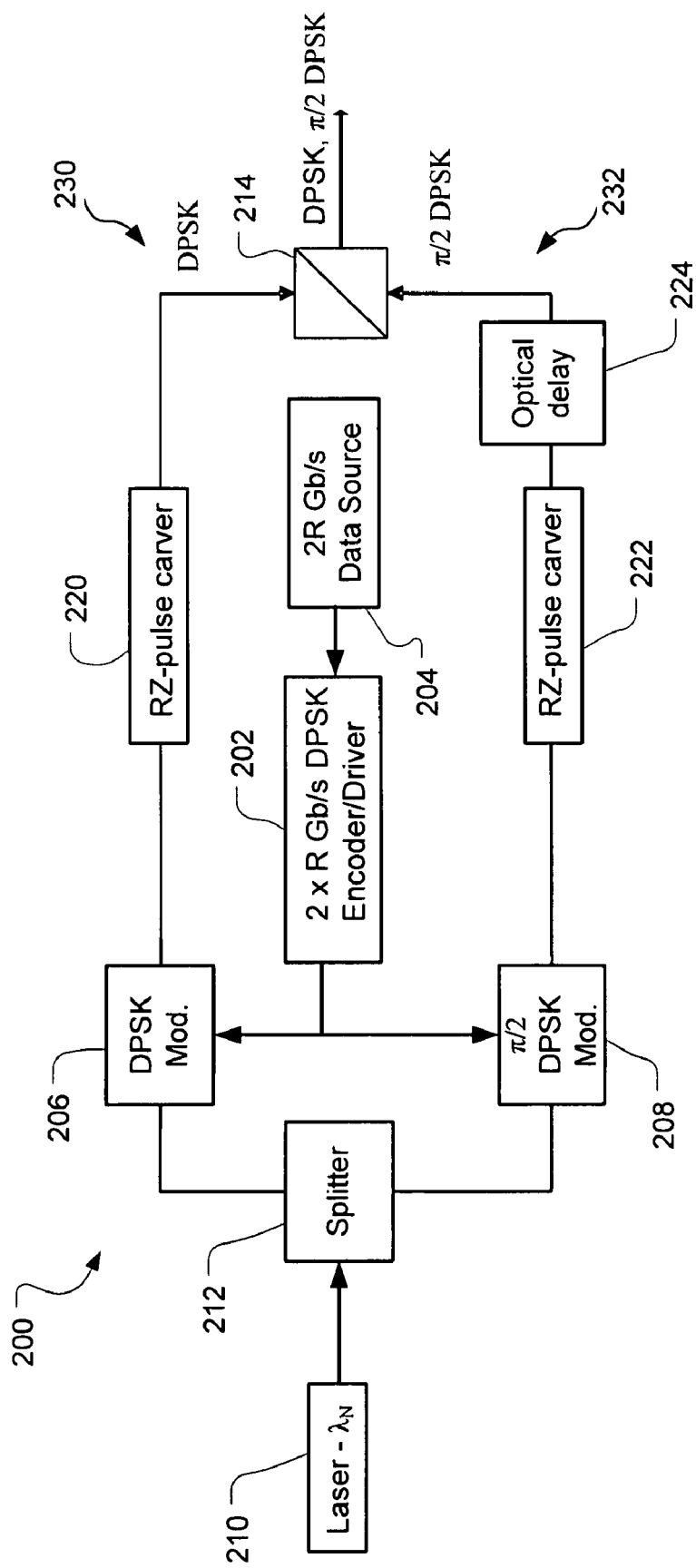
FIG. 2 is a simplified block diagram of one exemplary embodiment of a transmitter consistent with the present disclosure.

FIG. 2 is a simplified block diagram of one exemplary transmitter 200 consistent with the present disclosure. In general, the transmitter 200 includes separate modulation arms or polarization tributaries 230, 232 that provide DPSK modulation using the different DPSK modulation schemes (e.g., DPSK and $\pi/2$ DPSK) and that are combined to provide the orthogonal polarization. For simplicity and ease of explanation, the illustrated exemplary embodiment is described in connection with a specific modulation format, i.e. RZ-DPSK, bit rate and arrangement of modulators. However, the exemplary embodiments described herein are presented by way of illustration, not of limitation. A system consistent with the present disclosure may be implemented using any DPSK modulation format, bit rate and/or arrangement of modulators.

The illustrated exemplary embodiment of the transmitter 200 includes a 2×R Gb/s DPSK Encoder/Driver 202 that receives an R Gb/s data signal from an R Gb/s data source 204. For ease of explanation, the embodiment 200 will be described herein with respect to the Encoder/Driver 202 configured as a 2×20 Gb/s DPSK Encoder Driver and the data source 204 configured as a 40 Gb/s Data source 204; however, R may represent any data rate.

In a known fashion, the DPSK Encoder/Driver 202 may time-division multiplex a 40 Gb/s data signal from the data source 204 into two separate 20 Gb/s data signals and provide DPSK-encoded versions of the separate 20 Gb/s signals to first and second DPSK modulators 206, 208. The DPSK modulators 206, 208 may be configured for encoding the 20 Gb/s signals onto respective first and second optical signals in a known fashion using a DPSK format. In particular, the first DPSK modulator 206 may modulate a first optical signal using regular DPSK such that a digital "1" is represented by a substantially $\pi$ phase shift and a digital "0" is represented by substantially no phase shift (or vice versa) and the second DPSK modulator may modulate a second optical signal using $\pi/2$ DPSK such that a digital "1" is represented by a substantially $\pi/2$ phase shift and a digital "0" is represented by a substantially $-\pi/2$ phase shift (or vice versa). In other words, the $\pi/2$ DPSK modulated signal has a $\pi/2$ phase difference between neighboring bits, whereas the DPSK modulated signal has either a 0 or $\pi$ phase difference between neighboring bits. As understood by one skilled in the art, the phase shifts in a DPSK or $\pi/2$ DPSK modulation scheme may not be precisely 0, $\pi$, or $\pi/2$ and may vary within known acceptable tolerances such that the phase shifts are approximately or substantially 0, $\pi$, or $\pi/2$.

The illustrated exemplary embodiment 200 may include a laser 210 for producing a continuous wave (CW) optical signal having wavelength $\lambda_N$ and a splitter 212 (i.e., a power splitter) for splitting the CW optical signal into first and second optical signals. The first and second optical signals may be coupled to the first and second DPSK modulators 206, 208, respectively, for encoding the respective 20 Gb/s data signals onto the optical signals using the respective DPSK and $\pi/2$ DPSK modulation formats, producing modulated optical information signals on carrier wavelength $\lambda_N$. Although the use of different DPSK modulation schemes on a single wavelength enables the use of the single laser 210 with the splitter 212, multiple lasers may also be used to generate the first and second optical signals.

In one embodiment, the transmitter may be configured to impart an RZ-DPSK modulation as described in U.S. Patent Application Publication No. 2004/0161245 by Neal S. Bergano entitled "Synchronous Amplitude Modulation For Improved Performance Of Optical Transmission Systems," which is fully incorporated herein by reference. The transmitter 200 may include RZ-pulse carvers 220, 222, such as amplitude modulators, to form or carve the RZ pulses on the respective DPSK and $\pi/2$ DPSK modulated optical signals.

The RZ-DPSK and $\pi/2$ RZ-DPSK modulated optical signals on the polarization tributaries 230, 232 may then be coupled to respective inputs of a known polarization combiner 214. The polarization combiner 214 multiplexes the RZ-DPSK and π/2 RZ-DPSK modulated optical signals into an aggregate signal and polarizes the outputs so that they are relatively orthogonally polarized, i.e. the signal modulated using DPSK is orthogonally polarized relative to the signal modulated using π/2 DPSK. One of ordinary skill in the art will recognize that the functionality of the polarization combiner may be accomplished using, for example, a conventional directional coupler in which the states of polarizations of the inputs are carefully adjusted.

To provide bit interleaving of the orthogonally polarized signals, at least one of the polarization tributaries 230, 232 may include an optical delay line or element 224, which may be adjusted such that the optical signals on the polarization tributaries 230, 232 are shifted by ½ bit at the output of the polarization combiner 214. Although the optical delay element 224 is shown on the π/2 DPSK polarization tributary 232, an optical delay element may also be provided on the DPSK polarization tributary 230 such that the bits are relatively shifted to provide bit interleaving. Although the optical delay element 224 is shown with a simplified diagrammatic representation in FIG. 2, one implementation of an optical delay to provide bit interleaving is described in greater detail below in connection with FIG. 3.

Figure 3:
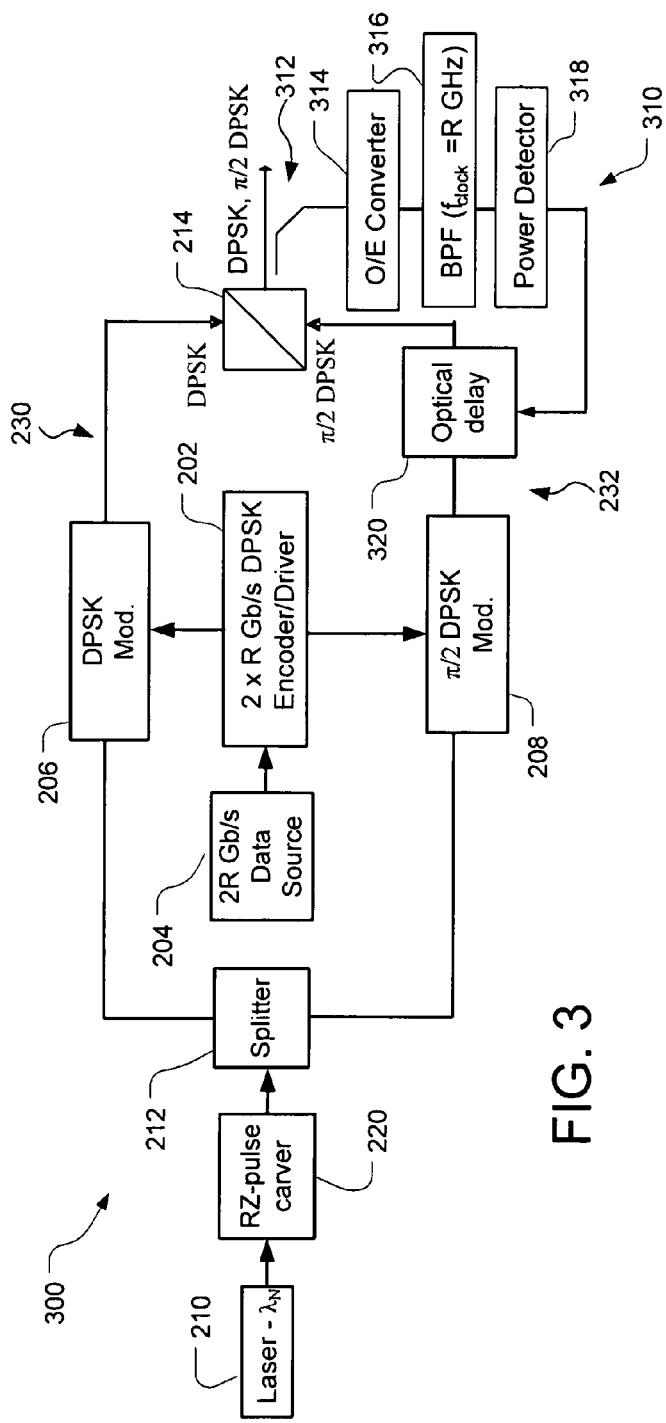
FIG. 3 is a simplified block diagram of another exemplary embodiment of a transmitter consistent with the present disclosure.

As shown in FIG. 3, another embodiment of a transmitter 300 may include a single RZ-pulse carver 220 located between the laser 210 and the splitter 212. In other words, the amplitude modulation may be applied to form the RZ pulses before the DPSK modulation. This embodiment of the transmitter allows each of the DPSK arms or tributaries 230, 232 to share the same RZ-pulse carver and thus further lowers the cost and complexity of the transmitter.

FIG. 3 also shows an exemplary embodiment of a feedback path 310 that may be used to accomplish bit interleaving of the DPSK and π/2 DPSK signals. In the illustrated exemplary embodiment, the feedback path 310 may include a coupler 312, a known optical-to-electrical (O/E) converter 314, an electrical band pass filter 316 and a RF power detector 318. The coupler 312 may take a known configuration for coupling a portion, e.g. 10%, of the polarizer output to O/E converter 314. The O/E converter 314 may convert the coupler output into an electrical signal in a known fashion and provide the electrical signal as an output to the electrical band pass filter 316. The electrical band pass filter 316 may take a known configuration having a center frequency equal to the clock frequency of the signals modulated, e.g. 20 GHz in an embodiment where the data source provides a 40 Gb/s data signal. The output of the band pass filter 316 may be coupled to the power detector 318. The RF power detector 318 may also take a known configuration for detecting the optical power at the center frequency of the band pass filter 316. The output of the power detector 318 is provided to a variable delay element 320.

The delay element 320 may be coupled to the modulator 208 for imparting a variable delay to the pulses modulated on the tributary 232 by the modulator 208. The variable delay may be imparted in response to the output of the power detector 318 for adjusting the relative timing between the optical pulses modulated on the polarization tributaries 230, 232 so that they are bit-interleaved. In general, if the optical pulses modulated on the polarization tributaries 230, 232 are perfectly aligned the power detector 318 would detect maximum optical power at the clock frequency. In one embodiment, therefore, the power detector 318 may provide a feedback signal to the delay element 320 configured to minimize the optical power at the clock frequency, thereby achieving bit-interleaving.

Figure 4:
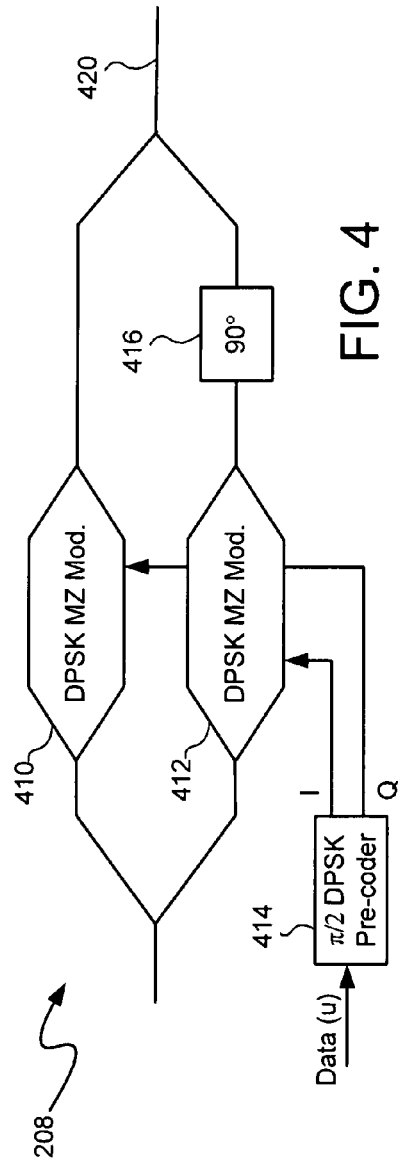
FIG. 4 is a simplified block diagram of one exemplary embodiment of a π/2 differential phase shift keying (DPSK) modulator consistent with the present disclosure.

Referring to FIG. 4, one embodiment of a π/2 DPSK modulator 208 may include nested Mach-Zehnder (MZ) modulators 410, 412, for example, similar to a known configuration used for differential quadrature phase shift keying (DQPSK) but with π/2 DPSK precoding. The π/2 DPSK modulator 208 may include a π/2 DPSK pre-coder 414 to encode the input data (u) and provide in-phase (I) and quadrature-phase (Q) inputs to the respective MZ modulators 410, 412. For input data $u_n$, for example, the in-phase ($I_n$) and quadrature phase ($Q_n$) inputs of the π/2 DPSK modulator 208 may be encoded according to the following equations:

$$I_n = u_n \oplus Q_{n-1}$$

$$Q_n = \overline{u_n} \oplus I_{n-1}$$

The π/2 DPSK modulator 208 further includes a phase shifter 416 on one path or arm, which applies a phase shift of substantially π/2 or 90° such that the relative phase difference between the optical signals passing along the paths of the MZ modulators 410, 412 is substantially π/2. The optical signals are then combined to provide a π/2 DPSK output 420.

Figure 5:
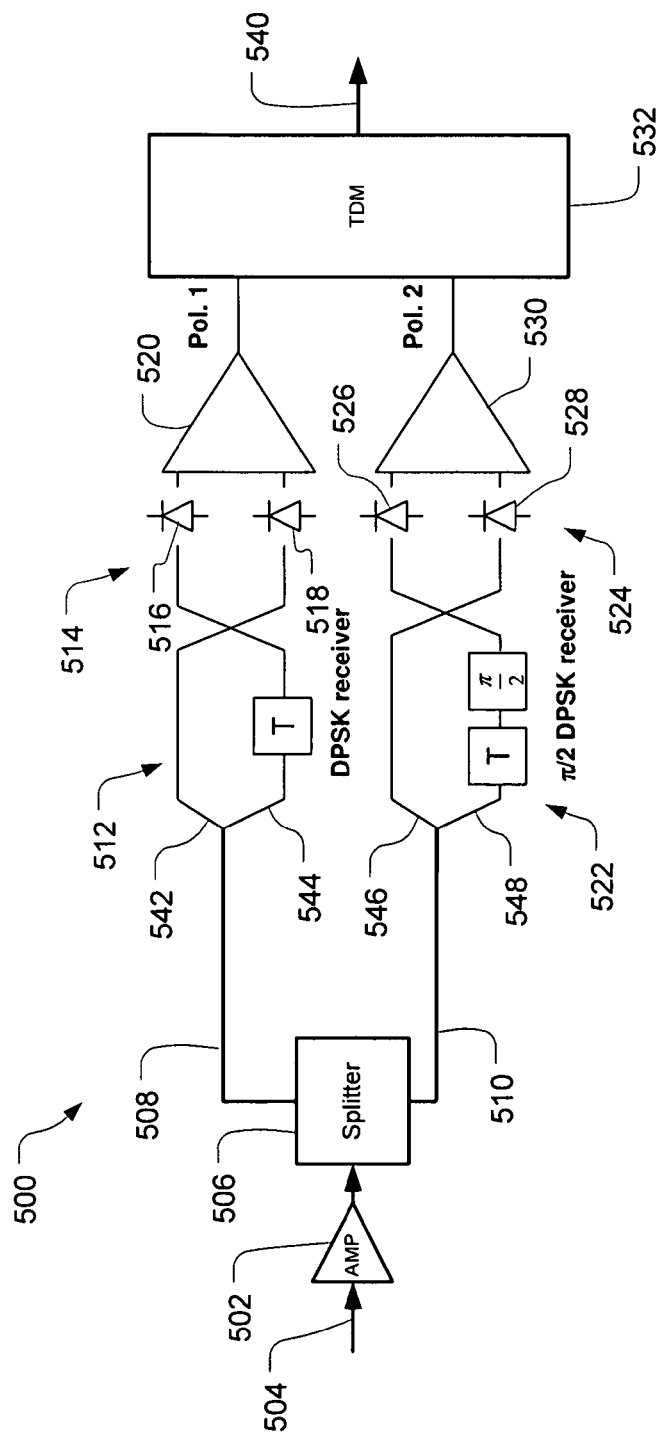
FIG. 5 is a simplified block diagram of one exemplary embodiment of a receiver consistent with the present disclosure.

Turning to FIG. 5, an exemplary receiver 500 consistent with the present disclosure is shown and described. The illustrated exemplary embodiment includes an amplifier 502, e.g. an erbium doped fiber amplifier (EDFA) for receiving and amplifying a polarization multiplexed DPSK modulated optical signal provided on path 504, and a known splitter 506 for splitting the output of the amplifier 502 onto first and second paths 508, 510. A first DPSK demodulator 512 is coupled to the first path 508, and a first dual balanced detector configuration 514 including first and second photodetectors 516, 518 is coupled to the output of the first DPSK demodulator 512. A second DPSK demodulator 522 (e.g., a π/2 DPSK demodulator) is coupled to the second path 510 and a second dual balanced detector configuration 524 including first and second photodetectors 526, 528 is coupled to the output of the second DPSK demodulator 522. The balanced detectors 514, 524 further include first and second differential amplifiers 520, 530 coupled to the output of the respective pairs of photodectors 516, 518 and 526, 528. A time-division multiplexer 532 is coupled to the outputs of the differential amplifiers 520, 530, respectively, to interleave the data at the inputs thereof to provide an electrical output on path 540 representative of the input provided on path 504.

Those of ordinary skill in the art will recognize that the illustrated receiver is depicted in simplified diagrammatic form for ease of explanation. Other components, such a band pass filter at the input, clock and data recovery (CDR) circuits at the outputs of the balanced detectors, feedback paths for controlling the operating characteristics of the demodulators, etc. may be incorporated into a receiver consistent with the present disclosure. In one embodiment, for example, each of the DPSK demodulators may be configured as described in U.S. Pat. No. 7,333,732 by Jerzy Domagala entitled "Optical Receiver," the teachings of which are fully incorporated herein by reference.

The DPSK demodulators 512, 522 may each include a known interferometer, such as a Mach-Zehnder interferometer, configured to split light onto two separate optical paths/arms 542, 544, and 546, 548, respectively, and configured to recombine the light interferometrically. One of the paths 544, 548 in each of the DPSK demodulators 512, 522 may have an optical path length 1-data bit longer (represented by time delay component T) than the other path to impart a desired 1 bit time-delay compared to the signal on the other path 542, 546 of the associated demodulator. The recombination of the optical signal and the delayed optical signal results in constructive and destructive interference corresponding to the digital "ones" and "zeros" modulated on the signal, thereby demodulating the signal. In the exemplary embodiment, the second DPSK demodulator 522 also provides a substantially π/2 phase offset on one arm or path 548 of the interferometer such that the second DPSK demodulator 522 demodulates the π/2 DPSK modulated signal, which has a substantially π/2 phase difference between neighboring bits.

According to an exemplary embodiment where the polarization multiplexed signals are modulated using the different DPSK and π/2 DPSK modulation schemes, the first DPSK demodulator 512 demodulates the DPSK modulated signal while blocking the π/2 DPSK modulated signal and the second DPSK demodulator 522 demodulates the π/2 DPSK modulated signal while blocking the DPSK modulated signal. As mentioned above, the π/2 DPSK modulated signal has a substantially π/2 phase difference between two neighboring bits. When this π/2 DPSK modulated signal is sent to the regular DPSK demodulator 512, the π/2 DPSK modulated signal experiences incoherent summation of the neighboring bits on both the constructive and destructive ports of the demodulator 512, which is mostly canceled out by the balanced detector 514.

Figure 5A:
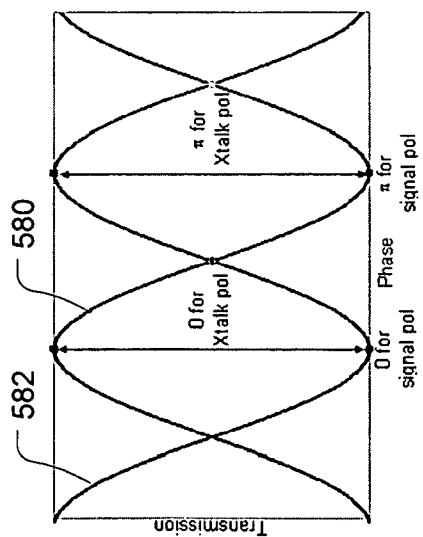
FIG. 5A is a plot of relative optical power versus phase offset at the constructive and destructive ports of a modulator consistent with the present disclosure.

In particular, as a result of the 1-bit time-delay provided in the path 544 of the DPSK demodulator 512, coherent summation occurs between the interfering optical signal on path 542 and delayed optical signal on path 544 when the signal has a substantially 0 or π phase difference between neighboring bits. As a result, the light from one output of the demodulator (constructive arm) may represent digital "ones" and the light from the other output (destructive arm) may represent digital "zeros" if the phase difference between two neighboring bits is zero and vice-versa if the phase difference between two neighboring bits is π. FIG. 5A, for example, includes plots 580, 582 illustrating the relative transmission function for outputs of the DPSK demodulator 512. Plot 580 illustrates the optical transmission function (i.e., relative power vs. optical phase offset) at the constructive port of the demodulator and plot 582 illustrates the optical transmission function at the destructive port. As shown, when the DPSK modulated signal is demodulated by the DPSK demodulator 512, the signals at the output ports of the demodulator have different values representative of the ones and zeros modulated on the on DPSK modulated signal. However, since the π/2 DPSK modulated signal has a substantially π/2 phase difference between neighboring bits, there is no coherent summation between the π/2 DPSK modulated signal and its 1-bit delayed signal at the constructive port and destructive port of the demodulator.

When the optical outputs of the DPSK demodulator 512 are imparted on the first and second photodetectors 516, 518, associated electrical outputs are provided to the differential amplifier 520. The output of the differential amplifier 520 includes ones and negative ones depending on the modulated 0 or π phase differences on the DPSK modulated signal. In response to the π/2 DPSK modulated signal having the substantially π/2 phase difference between neighboring bits, the incoherent summation results in equal photo currents being provided at the outputs of the balanced detector 514, which are cancelled out by the differential amplifier 520. The output of the differential amplifier 520 therefore represents only the ones and zeros modulated on the DPSK modulated signal and the π/2 DPSK modulated signal is effectively blocked or cancelled without use of a polarization controller or polarizer.

When the regular DPSK modulated signal is sent to the π/2 DPSK demodulator 522 having a substantially π/2 phase offset between the demodulator arms 546, 548, the regular DPSK modulated signal, which has a substantially 0 or π phase difference between two neighboring bits, similarly experiences incoherent summation of the two neighboring bits on the constructive and destructive ports of the demodulator 522. This incoherent summation is similarly mostly canceled out by the balanced detector 524. Thus, the two orthogonally polarized signals are effectively separated using the properties of the DPSK demodulators 512, 522 in the receiver 500.

The outputs of the DPSK demodulators 520, 530 are coupled to the inputs of the time-division multiplexer 532. The time-division multiplexer 532 may interleave the DPSK demodulator outputs to provide an aggregate electrical output on path 540 representative of the input received on path 504. In an embodiment wherein the transmitter is configured as illustrated in FIG. 2, for example, the aggregate output may represent the data provided by the 40 Gb/s data source 204.

Polarization multiplexing with different DPSK modulation schemes is thus capable of providing advantages as compared, for example, to a conventional POLMUX-DPSK or a frequency offset POLMUX-DPSK. As mentioned above, a system and method consistent with the present disclosure eliminates the need for a polarization controller and polarization beam splitter (PBS) in the receiver and thus may reduce Q-factor degradation caused by the polarization controller and PBS. Moreover, bit-interleaving the DPSK and π/2 DPSK modulated signals reduces penalties from additional neighboring signal ASE beating noise by separating the neighboring-ASE noise from the sampling time.

Polarization multiplexing with different DPSK modulation schemes consistent with the present disclosure is capable of using a single laser and RZ-pulse carver, thereby eliminating the need to control the frequency separation of two lasers and reducing the cost and complexity associated with additional lasers and RZ pulse carvers. Also, the effective signal bandwidth may be smaller using polarization multiplexing with different DPSK and may have higher tolerance to strong optical filtering in very high spectral efficient transmission (e.g., >1 bit/sec/Hz).

Polarization multiplexing with different DPSK schemes consistent with the present disclosure may also have higher tolerance to polarization mode dispersion (PMD). Without the need for frequency separation, the orthogonal polarization of the optical signals can theoretically be better maintained and tolerance to PMD may be increased potentially by 25%.

According to one aspect of the disclosure, an apparatus includes a driver configured to receive a data signal having an original data rate of 2R Gb/s, and configured to separate the data signal into first and second data signals, each of the first and second data signals having a data rate of R Gb/s. The apparatus further includes a first differential phase shift keying (DPSK) modulator for modulating the first data signal on a first optical signal using a first DPSK modulation scheme to provide a first optical data signal, and a second DPSK modulator for modulating the second data signal on a second optical signal with a second DPSK modulation scheme to provide a second optical data signal. The first DPSK modulation scheme uses a phase shift to represent data bits that is different than a phase shift used by the second DPSK modulation scheme to represent data bits. The apparatus further includes an optical delay element coupled to the second DPSK demodulator configured for imparting a delay to the second optical data signal compared to first optical data signal, and a combiner coupled to an output of the first DPSK modulator and an output of the second DPSK modulator and configured for combining the first optical data signal and the second optical data signal into an aggregate signal for coupling to an optical information channel. The first optical data signal is relatively orthogonally polarized relative to the second optical data signal.

According to another aspect of the disclosure, a method includes: separating a data signal having a data rate of 2R Gb/s into first and second data signals, each of the first and second data signals having a data rate of R Gb/s; modulating the first data signal on a first optical signal with a first differential phase shift keying (DPSK) data modulation scheme to provide a first optical data signal; modulating the second data signal on a second optical signal with a second DPSK data modulation scheme to provide a second optical data signal, wherein the first DPSK modulation scheme uses a phase shift to represent data bits that is different than a phase shift used by the second DPSK modulation scheme to represent data bits; imparting a relative delay between the first and second optical data signals such that the first and second optical data signals are bit interleaved; orthogonally polarizing the first and second optical signals relative to each other; and combining the first and second optical data signals into an aggregate signal for coupling to the optical information channel.

According to another aspect of the disclosure, an apparatus includes a first DPSK demodulator configured for receiving an aggregate optical signal including polarization multiplexed first and second optical signals. The first optical signal has data modulated thereon according to a first differential phase shift keying (DPSK) modulation scheme and the second optical signal has data modulated thereon according to a second DPSK modulation scheme. The first DPSK modulation scheme uses a phase shift to represent data bits that is different than a phase shift used by the second DPSK modulation scheme to represent data bits, and the first DPSK demodulator is configured to demodulate the first optical signal. The apparatus also includes a second DPSK demodulator configured for receiving the aggregate optical signal including the first and second optical signals and configured to demodulate the second optical signal. The apparatus further includes a first dual balanced detector coupled to the first DPSK demodulator and configured to detect the first demodulated optical signal and configured to substantially cancel out detected portions of the second optical signal and a second dual balanced detector coupled to the second DPSK demodulator and configured to detect the second demodulated optical signal and configured to substantially cancel out detected portions of the first optical signal. First and second differential amplifier are coupled to the first and second dual balanced detectors.

According to another aspect of the disclosure, a method includes: receiving an aggregate optical signal including polarization multiplexed first and second optical signals, the first optical signal having data modulated thereon according to a first differential phase shift keying (DPSK) modulation format and the second optical signal having data modulated thereon according to a second DPSK modulation format, wherein the first DPSK modulation scheme uses a phase shift to represent data bits that is different than a phase shift used by the second DPSK modulation scheme to represent data bits; demodulating the first and second optical signals using first and second DPSK demodulators, respectively; and detecting the demodulated first and second optical signals using first and second dual balanced detectors, respectively.

The embodiments that have been described herein but some of the several which utilize a system or method consistent with the present disclosure and are set forth herein by way of illustration but not of limitation. Many other embodiments, which will be readily apparent to those skilled in the art, may be made without departing materially from the spirit and scope of the disclosure.

What is claimed is:

1. An optical communication system comprising:
   a driver configured to receive a data signal having an original data rate of 2R Gb/s, and configured to separate the data signal into first and second data signals, each of the first and second data signals having a data rate of R Gb/s;
   a first differential phase shift keying (DPSK) modulator for modulating the first data signal on a first optical signal using a first DPSK modulation scheme to provide a first optical data signal;
   a second DPSK modulator for modulating the second data signal on a second optical signal with a second DPSK modulation scheme to provide a second optical data signal, wherein the first DPSK modulation scheme uses a first phase shift to represent data bits that is different than a second phase shift used by the second DPSK modulation scheme to represent data bits;
   an optical delay element coupled to the second DPSK demodulator configured for imparting a delay to the second optical data signal compared to first optical data signal; and
   a combiner coupled to an output of the first DPSK modulator and an output of the second DPSK modulator and configured for combining the first optical data signal and the second optical data signal into an aggregate signal for coupling to an optical information channel, the first optical data signal being relatively orthogonally polarized relative to the second optical data signal;
   a first DPSK demodulator configured for receiving the aggregate signal and to demodulate the first optical signal, said first DPSK demodulator being configured to separate light onto associated first and second optical paths, said second optical path of said first DPSK demodulator being configured to impart a first delay to said first and second optical signals to cause coherent summation of neighboring bits of said first optical signal and incoherent summation of neighboring bits of said second optical signal when light from said first and second optical paths of said first DPSK demodulator is combined interferometrically; and
   a second DPSK demodulator configured for receiving the aggregate signal and to demodulate the second optical signal, said second DPSK demodulator being configured to separate light onto associated first and second optical paths, said second optical path of said second DPSK demodulator being configured to impart said first delay and said second phase shift to said first and second optical signals to cause coherent summation of neighboring bits of said second optical signal and incoherent summation of neighboring bits of said first optical signal when light from said first and second optical paths of said second DPSK demodulator is combined interferometrically.

2. The optical communication system according to claim 1, wherein the first DPSK modulation scheme uses regular DPSK such that the first optical data signal has a substantially 0 or $\pi$ phase difference between neighboring bits, and wherein the second DPSK modulation scheme uses $\pi/2$ DPSK such that the second optical data signal has a substantially $\pi/2$ phase difference between neighboring bits.

3. The optical communication system according to claim 1, further comprising at least one RZ-pulse carver configured to form RZ pulses in the optical signals.

4. The optical communication system according to claim 3, wherein the at least one RZ-pulse carver includes first and second RZ-pulse carvers following the first and second DPSK modulators, respectively, for forming RZ pulses in the first and second optical data signals.

5. The optical communication system according to claim 1, further comprising:
a laser for generating an optical signal;
a splitter for splitting the optical signal into the first and second optical signals.

6. The optical communication system according to claim 1, further comprising at least one RZ-pulse between the laser and the splitter for forming RZ pulses in the optical signal generated by the laser.

7. The optical communication system according to claim 1, wherein the differential phase shift keying (DPSK) data modulation comprises a return-to-zero DPSK data modulation.

8. The optical communication system according to claim 1, further comprising an optical delay element configured to provide bit interleaving of the first and second optical data signals.

9. The optical communication system according to claim 1, further comprising:
a first balanced detector coupled to the first DPSK demodulator and configured to provide a first electrical output in response to the demodulated first optical signal; and
a second balanced detector coupled to the second DPSK demodulator and configured to provide a second electrical output in response to the demodulated second optical signal.

10. The optical communication system according to claim 1, further comprising:
a time-division multiplexer coupled to outputs of the first and second balanced detectors and configured for combining the outputs of the first and second balanced detectors into a demodulated aggregate signal having a data rate of 2R Gb/s.

11. An optical receiver comprising:
a first DPSK demodulator configured for receiving an aggregate optical signal including polarization multiplexed first and second optical signals, the first optical signal having data modulated thereon according to a first differential phase shift keying (DPSK) modulation scheme and the second optical signal having data modulated thereon according to a second DPSK modulation scheme, wherein the first DPSK modulation scheme uses a first phase shift to represent data bits that is different than a second phase shift used by the second DPSK modulation scheme to represent data bits, the first DPSK demodulator being configured to demodulate the first optical signal, said first DPSK demodulator being configured to separate light onto associated first and second optical paths, said second optical path of said first DPSK demodulator being configured to impart a first delay to said first and second optical signals to cause coherent summation of neighboring bits of said first optical signal and incoherent summation of neighboring bits of said second optical signal when light from said first and second optical paths of said first DPSK demodulator is combined interferometrically;
a second DPSK demodulator configured for receiving the aggregate optical signal including the first and second optical signals, the second demodulator being configured to demodulate the second optical signal, said second DPSK demodulator being configured to separate light onto associated first and second optical paths, said second optical path of said second DPSK demodulator being configured to impart said first delay and said second phase shift to said first and second optical signals to cause coherent summation of neighboring bits of said second optical signal and incoherent summation of neighboring bits of said first optical signal when light from said first and second optical paths of said second DPSK demodulator is combined interferometrically;
a first balanced detector coupled to the first DPSK demodulator and configured to detect the first demodulated optical signal and configured to substantially cancel out detected portions of the second optical signal;
a second balanced detector coupled to the second DPSK demodulator and configured to detect the second demodulated optical signal and configured to substantially cancel out detected portions of the first optical signal.

12. The optical receiver according to claim 11, wherein the first DPSK modulation scheme uses regular DPSK such that the first optical data signal has a substantially 0 or $\pi$ phase difference between neighboring bits, and wherein the second DPSK modulation scheme uses $\pi/2$ DPSK such that the second optical data signal has a substantially $\pi/2$ phase difference between neighboring bits.

13. The optical receiver according to claim 11, further comprising a time-division multiplexer coupled to an output of the first balanced detector and an output of the second balanced detector and configured for combining the output of the first balanced detector and the output of the second balanced detector into an aggregate signal having a data rate of 2R Gb/s.

14. The optical receiver according to claim 11, wherein the differential phase shift keying (DPSK) data modulation comprises a return-to-zero DPSK data modulation.

15. The optical receiver according to claim 11 wherein the first and second balanced detectors each comprise a pair of photodetectors and a differential amplifier coupled to the pair of photodetectors.

* * * * *